United States Patent [19]

Rodriguez

[11] Patent Number: 4,740,062
[45] Date of Patent: Apr. 26, 1988

[54] METHOD AND APPARATUS FOR LENSING A LIGHT BEAM

[75] Inventor: Sergio E. Rodriguez, Woodland Hills, Calif.

[73] Assignee: Rockwell International Corporation, El Segundo, Calif.

[21] Appl. No.: 917,139

[22] Filed: Oct. 9, 1986

[51] Int. Cl.$^4$ .............................................. G02B 3/12
[52] U.S. Cl. .................................................... 350/418
[58] Field of Search ....................... 350/418, 419, 413

[56] References Cited

U.S. PATENT DOCUMENTS

| | | | |
|---|---|---|---|
| 3,400,993 | 9/1968 | Beck et al. | 350/418 |
| 3,402,980 | 9/1968 | Hutson | 350/418 |
| 3,413,059 | 11/1968 | Berreman . | |
| 3,435,363 | 3/1969 | Patel | 330/4.3 |
| 3,521,190 | 7/1970 | Schimitschek et al. | 331/94.5 |
| 3,528,727 | 9/1970 | Halliday . | |
| 3,589,797 | 6/1971 | Miller et al. | 350/179 |
| 3,731,991 | 5/1973 | Arnold | 350/294 |
| 4,582,398 | 4/1986 | Roberts et al. | 350/419 |

OTHER PUBLICATIONS

Beck, "Gas Mixture Lens Measurements"; The Bell System Technical Journal; vol. XLIII, No. 4, part 2; 7/1964, pp. 1821–1825.
Imai, M., Ito, K. Matsumoto, T., "On a Curved Gas Lens with Idealized Medium", Electronics & Communications in Japan, vol. 51-B, No. 6, 1968, pp. 45–53.
Iga, K. Suematsu, Y., "Experimental Studies on the Focusing and Related Characteristics of the Hyperbolic-Type Gas Lens", Tokyo Institute of Technology, No. 89, 1968, pp. 81–98.
Iga, K. "Experimental Studies on the Limitation of Focusing Power of Hyperbolic-Type Gas Lens", Japanese Journal of Applied Physics, vol. 8, Feb. 1969, pp. 255–259.

Primary Examiner—Bruce Y. Arnold
Assistant Examiner—Rebecca D. Gass
Attorney, Agent, or Firm—H. Fredrick Hamann; Harry B. Field; Lawrence N. Ginsberg

[57] ABSTRACT

A gas lens 10 for lensing a light beam 12. A first gas is injected through orifices $18-18^n$ into enclosure 16 thereby forming a row of jets $14-14^n$. A second gas having a different index of refractivity than the first gas also is contained within the enclosure 16 in the form of a mantle 24 surrounding each jet $14-14^n$. The light beam 12 is lensed (either convergently or divergently) as it passes through the jet/mantle interfaces.

26 Claims, 5 Drawing Sheets

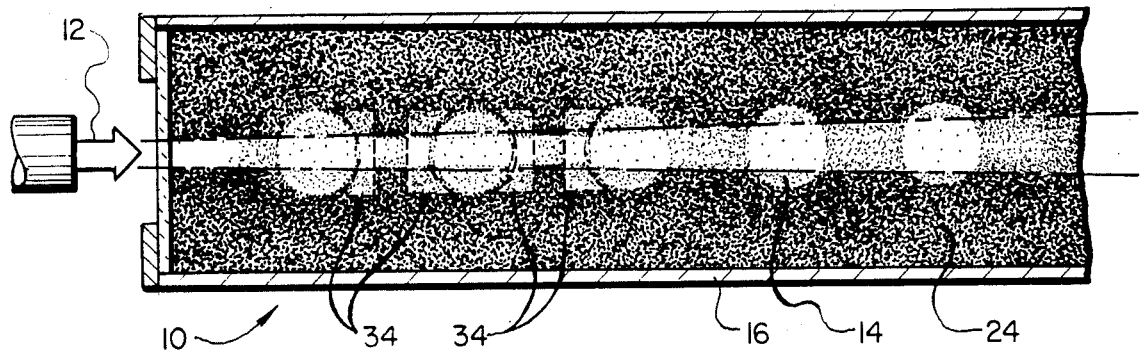
Fig. 2.
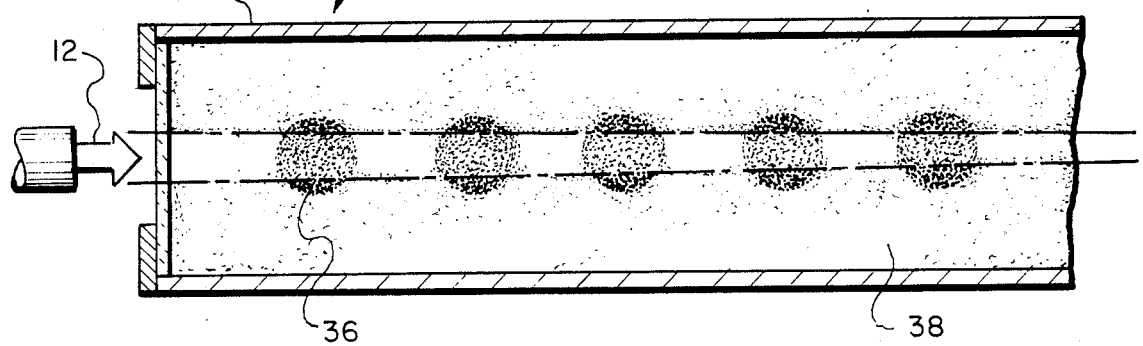
Fig. 3.
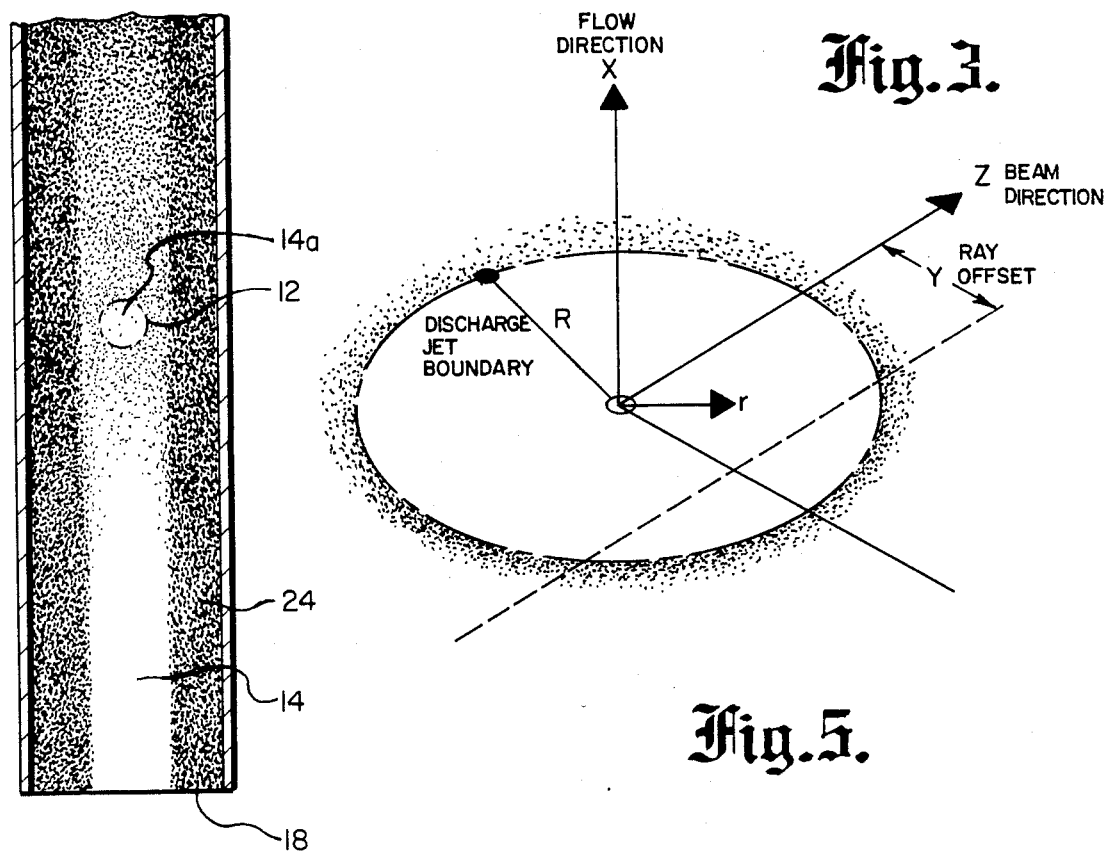
Fig. 4.
Fig. 5.

METHOD AND APPARATUS FOR LENSING A LIGHT BEAM

BACKGROUND OF THE INVENTION

1. Field of the Invention

The present invention is directed to optical lensing and more particularly to a method and apparatus for lensing a beam of light using a gas.

2. Description of the Prior Art

Special resonator problems exist with high-power lasers in which energy flux must be reduced to intensity levels tolerable by the resonator mirrors and other optical components. If the resonator relies solely on diffraction spreading of the beam for intensity reduction, very long spacing is required and alignment is problematic. One option for high-power resonators is to produce beam divergence by lensing with gases, i.e. using density or species gradients to produce lens effects. Unlike solid-state lenses, gases can provide a low-absorption, flowing lens structure conducive to low thermal distortion and immune from permanent damage.

The bending of light rays basically requires establishing a refractive-index gradient transverse to the ray path. For example, in the bending of light by a glass prism in air, the prism faces slant across the rays and the sharp transition from the refractive-index of glass to that of air provides the requisite transverse refractive-index gradient. Obtaining divergent or convergent lasing of a light beam additionally requires establishing a gradual variation in the transverse refractive index gradient so that the rays composing the beam experience different amounts of bending. For example, conventional glass-in-air lenses have curved surfaces so that the angle of the surface to the rays and hence the amount of bending varies across the beam.

The index of refraction of a gas largely depends on its molecular density and on the molecular species constituting the gas. Lensing by means of gases therefore requires gradients in either the molecular density or the molecular species. The density in turn depends on the pressure and temperature of the gas. It is noted that as used herein and as well known in the art, the term "lensing" refers to either converging or diverging the light beam. Lensing by means of pressure gradients within a gas flow is, for example, disclosed in U.S. Pat. No. 4,582,398 issued to T. G. Roberts and lensing by means of temperature gradients is disclosed in U.S. Pat. No. 3,435,363 issued to C. K. N. Patel.

These and other related approaches are unsuitable for laser applications because the required lensing strength cannot be conveniently produced and because their weak lensing gradients are easily disrupted by the laser energy, which in turn degrades the quality of the laser beam.

OBJECTS OF THE INVENTION

Accordingly, it is an object of this invention to provide a method and apparatus for lensing a light beam.

Another object is provide the capability to lens a high intensity laser.

Yet another object is to adjustably lens the light beam.

Other objects, advantages and novel features of the present invention will become apparent from the following detailed description of the invention when considered in conjunction with the accompanying drawing.

SUMMARY OF THE INVENTION

The present invention comprises a method and apparatus for lensing a beam of light. In its broadest aspects, the invention comprises providing a row of spaced columns of a first gas, providing a second gas, with a different refractive index than the gas in the columns, between and around the columns, and directing a light beam across the gas columns, the light beam being lensed as it passes across the various gaseous interfaces. With this approach, refractive index gradients and gas lensing are produced by juxtaposing bodies of gases having different refractive indices. With this approach, high and low refractive indices are brought in close proximity so that large refractive index gradients and strong lensing are readily obtained.

In the preferred embodiment a row of gas jets are formed by injecting a first gas through orifices into an enclosure. A second gas flows between and around the gas jets in the form of a mantle. A light beam is directed into the enclosure through a window on one side of the enclosure. The light beam then passes through the row of gas jets and is either diverged or converged by the various gaseous interfaces. The beam finally exits the enclosure through a window on the opposite side of the enclosure from the first window.

BRIEF DESCRIPTION OF THE DRAWINGS

FIG. 2 is a cross-sectional view of the gas lens taken along line 2—2 of FIG. 1.

FIG. 3 is a cross-sectional view of an embodiment of the gas lens in which a converging lensing action is produced.

FIG. 4 is a schematic representation of the interdiffusion of gases from a gas jet and a second flow of gas.

FIG. 5 shows a coordinate system applicable to a discussion regarding the diffusional characteristics of the flowing gases.

FIG. 10 shows the light beam prior to it being lensed;

FIG. 11 shows the light beam after being diverged at 300 torr;

FIG. 12 shows the light beam after being diverged at 450 torr.

The same elements or parts throughout the figures of the drawings are designated by the same reference characters, while equivalent elements bear a prime designation.

DETAILED DESCRIPTION OF THE INVENTION

Figure 1:
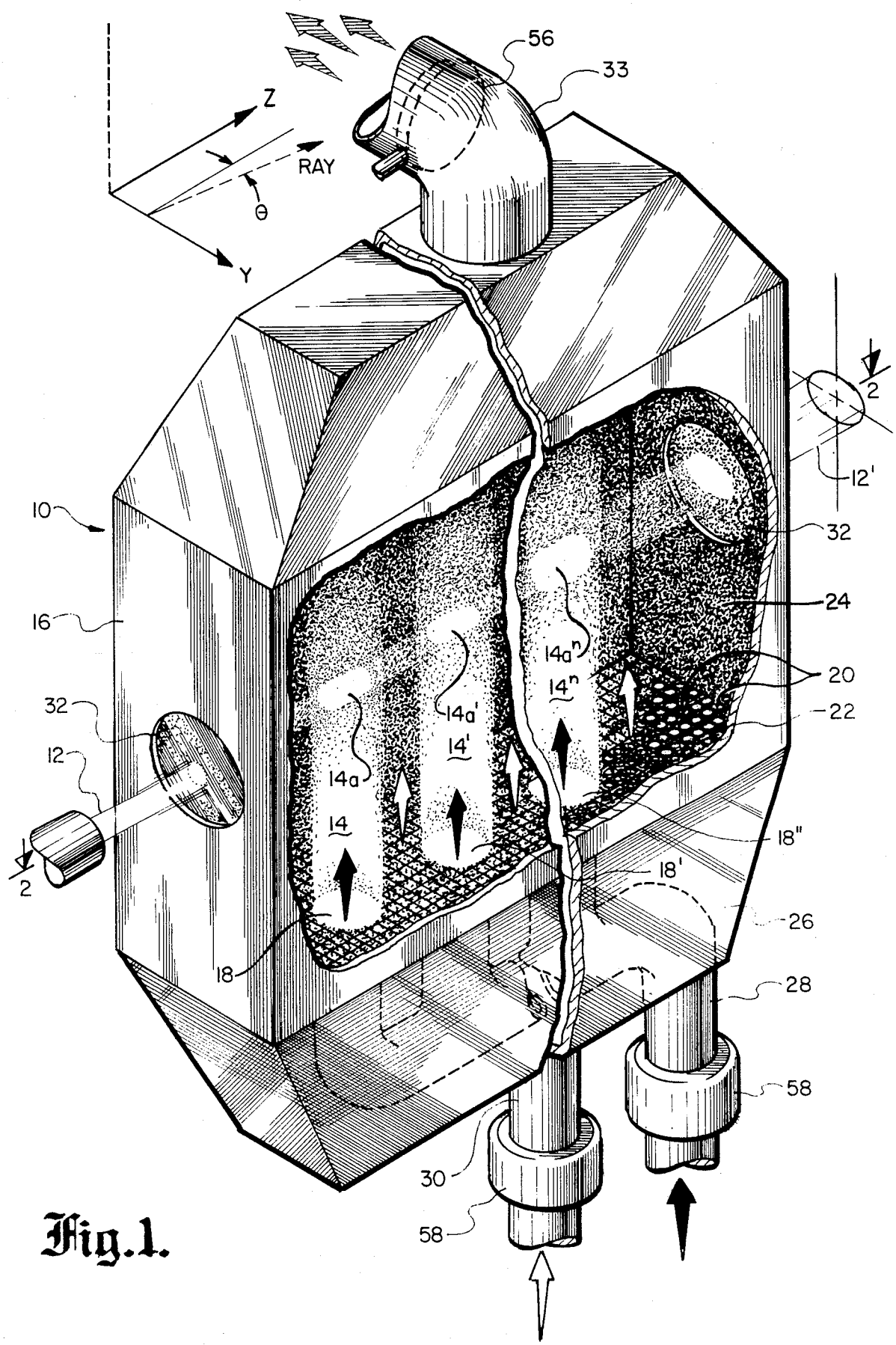
FIG. 1 is a perspective view, partially cut away, of a preferred embodiment of the gas lens of the present invention in which a divergent lensing action is produced.

Referring to the drawings and to the characters of reference marked thereon, FIG. 1 illustrates an embodiment of the apparatus 10 for lensing a light beam 12. A number of spaced columns or jets 14, 14′, ..., $14^n$ of a first gas are provided in a row in frame or enclosure 16. These spaced columns are preferably formed by injecting the first gas through orifices 18, 18′, ..., $18^n$ in the enclosure 16.

A second gas is injected through perforations 20 in a bottom plate 22 of the enclosure 16 and flows upward between and around the gas jets $14-14^n$ in the form of a mantle 24. (Although for the sake of clarity perforations 20 are only shown in the corner of bottom plate 22, they are in fact preferably along the entire discharging surface including orifices $18-18^n$ in order to provide uniform flows.) The gases are directed to their respective orifices or perforations by a manifold 26. Inlet 28 provides an entrance for the first gas. Inlet 30 provides an entrance for the second gas. After the first gas discharges through an orifice it is essentially columnar. As this first gas travels up through the enclosure it gradually becomes diffused as illustrated in FIG. 1. Windows 32 are located on each side of the enclosure 16. Lensing is obtained when the light beam 12 is directed through a window 32 at one side of the enclosure and through the row of gas jets $14-14^n$. The light beam is directed at selected locations $14a-14a^n$ such as to optimize the lensing as discussed below. The resultant magnified beam 12′ emerges through the second window 32 on the opposite side of the enclosure 16. If divergent lensing is desired, as in the embodiment of FIG. 1, jets $14-14^n$ consist of a low refractivity gas species such as helium or hydrogen. The mantle 24 should have relatively higher refractivity. If, for example, helium is used for the jets $14-14^n$ a companion mantle 24 might be nitrogen gas which has about ten times greater molal refractivity than helium. An outlet 33 is provided for discharging the gases.

As a rough approximation (excluding diffusion effects), the lensing may be considered to derive from the curved interfaces between the jets $14-14^n$ and the mantle 24. These interfaces are comparable to the curved air/glass surfaces of ordinary concave lenses. The beam thus diverges while passing through each interface. This effect is apparent in viewing phantom lines 34 in FIG. 2 which are analogous to the surfaces of an ordinary concave lens. The effect can be reversed and convergent lensing action established if the gases are reversed. As illustrated in FIG. 3, convergent lensing occurs when jets $36-36^n$ comprise a high refractivity gas and mantle 38 comprises a low refractivity gas.

A more formal statement of the gas field properties required for lensing is readily obtained by the following analysis:

FIG. 1 shows coordinate definitions: z is in the direction of beam propagation, y is transverse to the beam, $\theta$ is the deviation angle of a ray from the principal propagation direction. For gas lensing, ray deviations are small and refractive indices (n) are near unity; with these conditions, the ray direction changes along the beam according to $(\partial \theta/\partial z)=(\partial n/\partial y)$. Thus, transverse gradient of the index causes ray turning, but, if the gradient is linear ($\partial^2 n/\partial y^2=0$), all rays are turned alike and the result is simply beam steering. For lensing (beam divergence or convergence), the ray turning rate must vary across the beam and hence the index gradient must be non-linear ($\partial^2 n/\partial y^2 \neq 0$, positive values produce divergence, and conversely). A specially desirable lensing field produces uniform di- or convergence across the beam ($\partial n/\partial y=cy$, where the constant $c \neq 0$) and corresponds to a quadratic transverse variation of the refractive index.

The refractive index of gases is given by $n=1+G\rho$, where G is the Gladstone-Dale coefficient and $\rho$ is the molal density. Therefore, the prior considerations on index gradient can be translated to gradients in density and G coefficient, i.e. $(\partial n/\partial y)=(G(\partial \rho/\partial y)+\rho(\partial G/\partial y))$. Gradients in G imply a mixture of gas species and gradients in composition. For most practical lensing concepts, the mixtures have only two species and the Gladstone-Dale coefficient is given by $G=m_1 G_1 + m_2 G_2 = G_1 + (G_2 - G_1)m_2$, where m is mole fraction and 1,2 indicate the two species.

In summary, the transverse gradient in the gas refractivity index is:

$$\frac{\partial n}{\partial y} = G\frac{\partial \rho}{\partial y} + \rho(G_2 - G_1)\frac{\partial m_2}{\partial y} \quad (1)$$

This relationship leads to the possibilities:
(1) a "density lens" in a gas of fixed composition:

$$\frac{\partial^2 n}{\partial y^2} = G\frac{\partial^2 \rho}{\partial y^2} \neq 0 \text{ (preferably a constant)} \quad (2)$$

or,
(2) a "composition lens" at fixed gas density:

$$\frac{\partial^2 n}{\partial y^2} = \rho(G_2 - G_1)\frac{\partial^2 m_2}{\partial y^2} \neq 0 \text{ (preferably a constant)} \quad (3)$$

Hence, in terms of the generalized Equation 3, the composition gradients which produce the lensing in the device shown in FIG. 1 are concentrated at the jet/mantle interfaces. The lensing strength of these interfaces depends on: (1) interface curvature, which is determined by jet diameter, (2) molal density ($\rho$), which depends on pressure and temperature, and (3) the difference in refractivities ($G_2-G_1$) of the two species in the flow. These factors establish lensing by a single interface. The overall lensing by apparatus 10 will depend additionally on the number of jets used in series, which compounds the individual lensing action.

For example, halving the jet diameter approximately doubles the angular effect of the interface on the beam. Doubling the gas pressure at a given temperature also doubles the lensing effect. As noted, a suitable choice of gases might be helium, which has very low refractivity in combination with nitrogen, which has about ten times greater refractivity. However, the gas lens of the present invention is not constrained to any particular choice of gases, nor to particular magnitudes of gas density or flow dimensions.

As noted, the concept of a sharp, curved lensing interface between jet and mantle gases is an oversimplification which applies only near the flow discharge. In practice, the jet and mantle gases interdiffuse as the jet flows proceed away from the discharge orifices $18-18^n$. As shown most clearly in FIG. 4, an enlarged view of a single jet 14, the initially steep composition gradients which produce lensing are spread radially, and the lensing interface thus becomes a zone. One significant result of interdiffusion is to circularize the lensing zone, i.e. regardless of initial interface shape, diffusion eventually leads to circular concentration patterns downstream. Therefore, the shape of the jet discharge is not a key parameter as it would be if the interfaces remained sharp. Lens performance is relatively insensitive to imperfections of discharge orifice shape.

The initial results of this interface thickening by diffusion is to strengthen the lensing action because the effective jet diameter decreases, i.e. lensing depends on interface curvature so that inward and outward diffusion do not average out. At long distance from discharge the lensing will vanish as the composition becomes uniform by interdiffusion. Hence, lensing is a function of discharge-to-beam distance: lensing strength starts at some finite level, rises to a maximum, and then decays to zero.

The diffusional behavior can be illustrated and quantified by means of a simplified, analytical model. Let $(x,r)$ be cylindrical coordinates (see FIG. 5) with $x$ being along the jet flow and $r$ being the distance from the jet axis. Assume that flow velocity (V), binary diffusion coefficient (D), and molal density $\rho$ are all uniform throughout the jet and mantle flows. Other velocity components, downstream diffusion, buoyancy, etc. are neglected. Then the molal concentration (m) of either species is described by the diffusion equation: $(D/r)(\partial/\partial r)(r\partial m/\partial r)=V(\partial m/\partial x)$. Let m represent the mole fraction of the mantle gas and R=jet radius; the discharge (x=0) condition is m=0 for $r<R$, m=1 for $r>R$; assuming an infinite mantle, m=1 for infinite r or x. This formulation is analogous to transient temperature behavior by heat conduction starting from a cylindrical temperature discontinuity. Numerical approximations are available giving the mole fraction m as a function of dimensionless radial distance (r/R) and dimensionless downstream distance or Fourier number $F=Dx/VR^2$.

The overall ray deflection produced by this composition field is obtained by integrating the local turning rate $(\partial\theta/\partial z)$ along the beam direction, in FIG. 5. From the prior discussion, this local rate is equal to the transverse gradient of refractive index, $\partial n/\partial y$, or to $\rho\Delta G(\partial m/\partial y)$ (from Eq. 1) with $\Delta G=G_2-G_1$. The required integral may be expressed in dimensionless form as:

$$S = \frac{\Delta\theta}{\rho\Delta G} = 2 \int_0^\infty \frac{\partial m}{\partial(y/R)} d\left(\frac{z}{R}\right) \quad (4)$$

The integration goes from jet center (z=0) to infinity where the gradients vanish, and thus gives the overall ray deflection produced by one jet/mantle "interface" or halfjet. On doubling, $\Delta\theta$ is the deflection produced by a full jet element. Parameter S expresses that, other things equal, this deflection is proportional to the molal density $\rho$ and the refractivity difference ($\Delta G$) between the species.

Although rays deviate progressively away from the jet axis in passing through the composition field, a constant "offset" distance (y) from the axis is assumed in the integrations. This assumption cannot apply for infinite travel distances, even for small ray angles, but is good for jet elements within a closely-spaced row, which is really the case of interest. The infinite integration represents the elements at any spacing because their composition field are superposable, i.e. the deviation per element ($\Delta\theta$) remains the same regardless of spacing.

Figure 6:
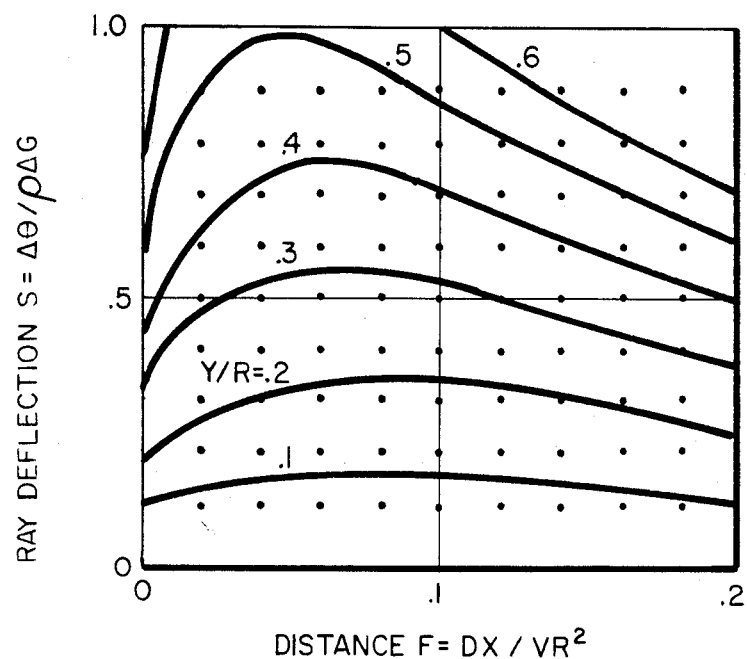
FIG. 6 is a plot of S, a dimensionless ray deflection parameter vs. F, a dimensionless parameter expressing the distance from discharge.

The model and computation thus give the ray deflection per jet (S) as a function of the downstream parameter $F=Dx/VR^2$ (which also scales the influence of diffusivity, velocity, and jet size) and of the ray offset y/R. FIG. 6 shows S vs. F for parametric values of y/R. At F=0, the ray deflection corresponds to the sharp interface limit; S=tan (y/R). As expected, the deflection increases with downstream distance, reaches a maximum, and then decays toward zero. For small offsets (y/R<0.3), the S maxima occur in the range F=0.05 to 0.1 and are considerably (80%) larger than the initial values. Thus, diffusion acts to produce a range of distances from discharge which are favorable for lensing. Beam rays within this range experience the strongest deflections, and, if the beam is narrow in relation to the maxima, the deflections will vary little across the beam.

Figure 7:
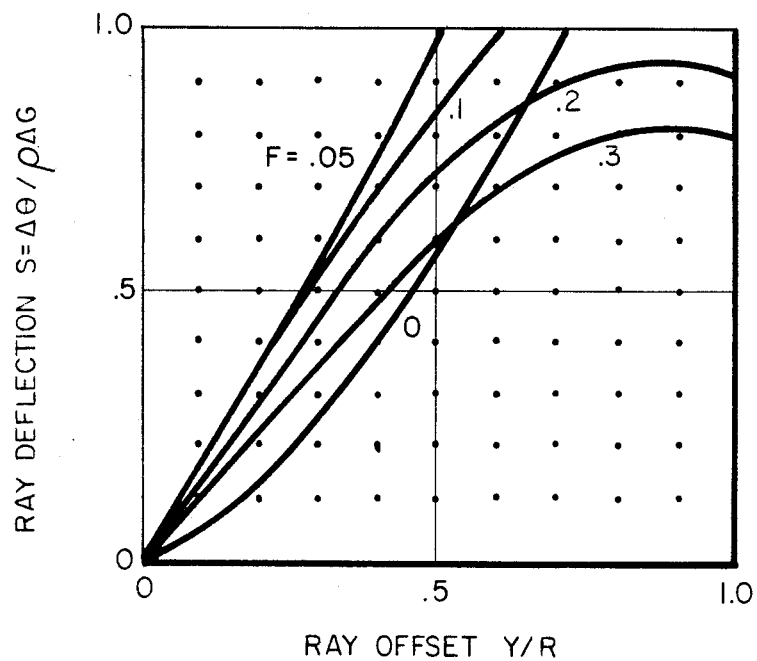
FIG. 7 is a plot of S vs. y, the dimensionless offset from the jet axis.

FIG. 7 is a crossplot of the same information, i.e. S vs. y/R for parametric values of F. In this plot the preferred lens shape (quadratic variation of refractive index) corresponds to linearity. The discharge shape is cylindrical and linearity only obtains for very small offsets. With increasing downstream distance (F), deflection increases making the plots steeper, and linearity also improves. In the approximate range F=0.05 to 0.1 the ray deflections are not only greatest and almost invariant, as previously indicated, but, in addition, the optimal lens shape extends up to larger ray offsets. This added desirable feature can be shown to be an inherent property of the diffusion process.

Flow turbulence is also of major importance for lens design and operation. Turbulence has two principal effects. First, it produces enhanced, variable diffusivity. Obviously, strong turbulence can weaken or even completely eliminate lensing, but, in small amounts, the time-averaged effect is not specifically harmful. The turbulence simply influences the spatial development of the composition gradients. However, another symptom of turbulence is temporal fluctuation in the refractive index, which of itself degrades beam quality. For low Mach number flows, index fluctuations arise primarily from eddying between regions of high and low index.

Turbulence sources are mainly associated with the jet/mantle interface. Velocity discontinuity at this interface is a well established source of eddying. Vorticity is also present in boundary layers at the discharge and in the wake of the base region between jet and mantle discharges. Good design would aim to minimize all these sources. Low velocity generally mitigates turbulence and also reduces gas usage, but very low velocity is undesirable in practice because: (1) residence time within the beam and energy absorption area increased; (2) the downstream extent of the favorable lensing zone is reduced; (3) buoyancy effects increase in importance; and (4) the flow is sensitized to accidental, weak disturbances.

Figure 8:
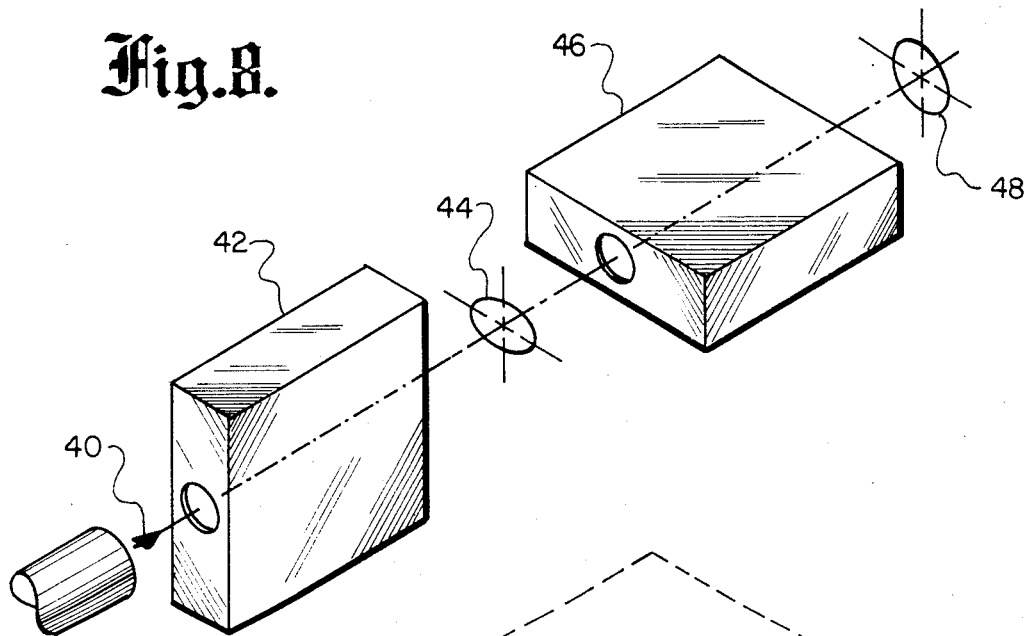
FIG. 8 is an illustration of a method for obtaining two-dimensional lensing by passing the light beam serially through lenses with different jet orientations.

The embodiment of the invention shown in FIG. 1 produces one-dimensional lensing. However, two-dimensional lensing may be obtained, for example, by (1) passing the light beam circularly through lenses with different jet orientations or (2) by using different jet orientations within a single lens. The first concept is illustrated in FIG. 8. The light beam 40 is first directed through a first enclosure 42 and magnified to an eliptical shape 44, then the beam 40 is directed through a second enclosure 46 of equal strength but acting perpendicular to the first enclosure 42. The second enclosure 46 magnifies the eliptical beam 44 to circular shape 48, thus achieving two-dimensional lensing. More generally, any desired output beam shape may be obtained by applying different one-dimensional lensing strengths along the different directions.

Figure 9:
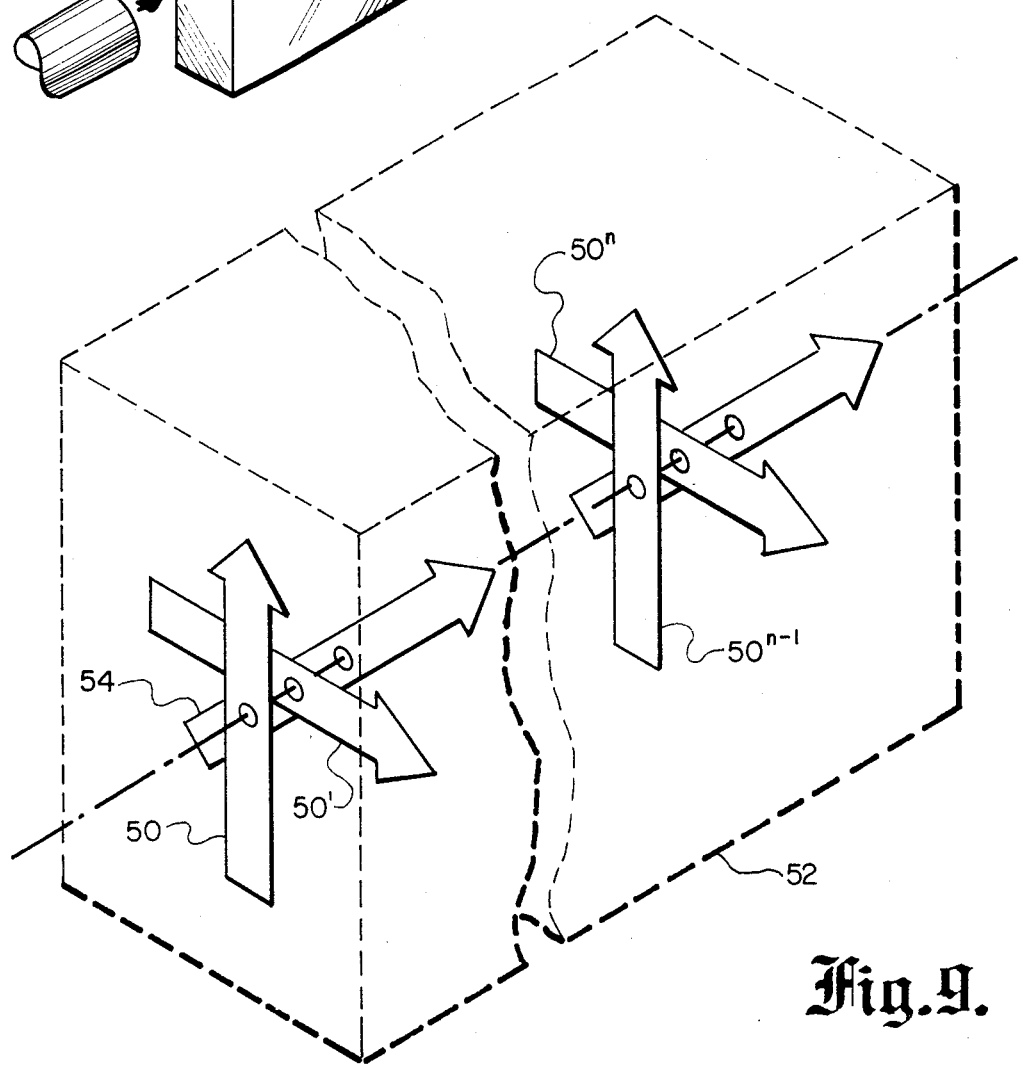
FIG. 9 is an illustration of a method for obtaining two-dimensional lensing by passing the light beam through a single lens utilizing jets with different orientations.

FIG. 9 schematically illustrates the second method for obtaining two-dimensional lensing. Gas jets 50–50$n$ are oriented in different directions in a single enclosure 52 thereby magnifying the light beam 54 in different directions and resulting in a two-dimensional lensing action.

A special advantage of the present method for lensing of high-intensity light beams, as in laser applications, is that the transverse flow minimizes the residence time of the lasing gas within the beam and consequently the absorption of energy from the beam. Energy absorption by the gas can lead to significant density changes with attendant distortion of the lensing field and the beam phasefront (degraded beam quality). By contrast, lensing flows which might be directed primarily along the beam, provide for long-time exposure of the lensing gas to the beam. If energy absorption is significant, this flow-to-beam alignment leads to design complications and/or poor performance.

The lensing strength (focal length) of the present gas lens 10 is readily controlled through the pressure of the lensing flow. Any convenient pressure control means 56 or temperature control means 58 may be utilized. A lens with different jet orientations yields two-dimensional lensing, as discussed above. Combining this with independent lensing control for the different stages provides a lensing system having adjustable output beam shape and magnification. Such a lensing system is tuneable for best performance within a particular optical train, for example, a laser optical resonator, and thereby provides desirable design flexibility. Furthermore, lens tuning can be implemented by means of output-controlled feedback signals for automatic, real-time optimization.

EXAMPLE

A gas lens was constructed with a flow enclosure measuring about 2.4×40 cm in cross section and 12 cm long downstream. The lens flow was upward as shown in FIG. 1. Beam windows were provided at the ends of the enclosure. The flow discharge at the bottom (upstream face) of the enclosure had 30 jets (1.2 cm diameter) along the centerline, and the rest of the cross-sectional area discharged the mantle flow. Downstream of the lens enclosure, the flow exhausted into a vacuum manifold; a variable choke between the enclosure and the exhaust vacuum served to control pressure within the enclosure.

Prior to its entering the lens enclosure, a green argon-laser beam was conditioned by optics to a diffraction-limited circular test beam of about 2 mm diameter. After passing through the lens enclosure this test beam was imaged on a distant screen.

The lens was operated with ambient temperature gases: helium in the jets and nitrogen in the mantle, which produced beam divergence. Flow velocity was varied in the range of 10–100 cm/sec and was adjusted as desired for image steadiness and clarity. Lens enclosure pressure was varied from about 200 to 700 torr; increasing pressure (density) had the expected effect of increasing lensing strength. At the high pressures, about 20 fold one-dimensional magnification was produced at a lens-image distance of about 4 meters (divergent focal length less than 20 cm).

Figure 10:
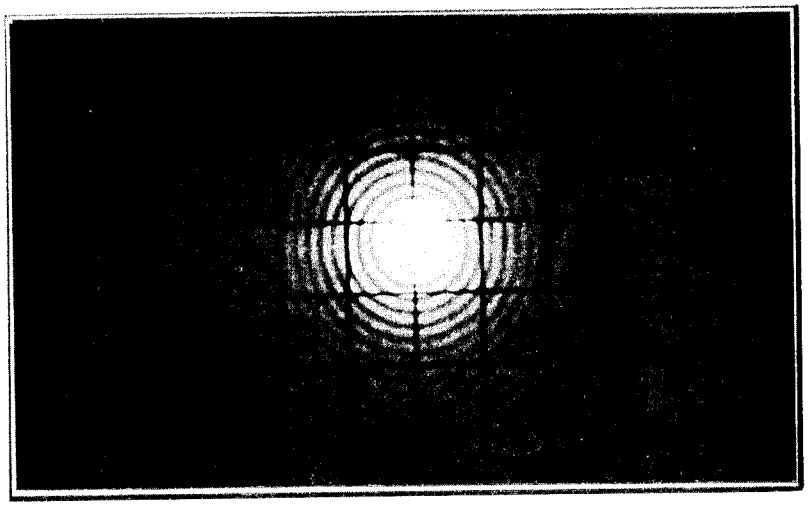
FIGS. 10, 11 and 12 are photographs taken from a reduction to practice of the present invention.
Figure 11:
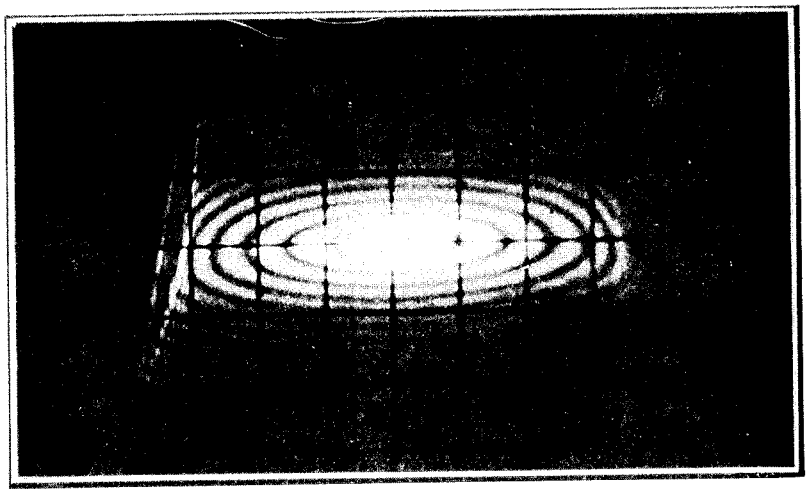
Figure 12:
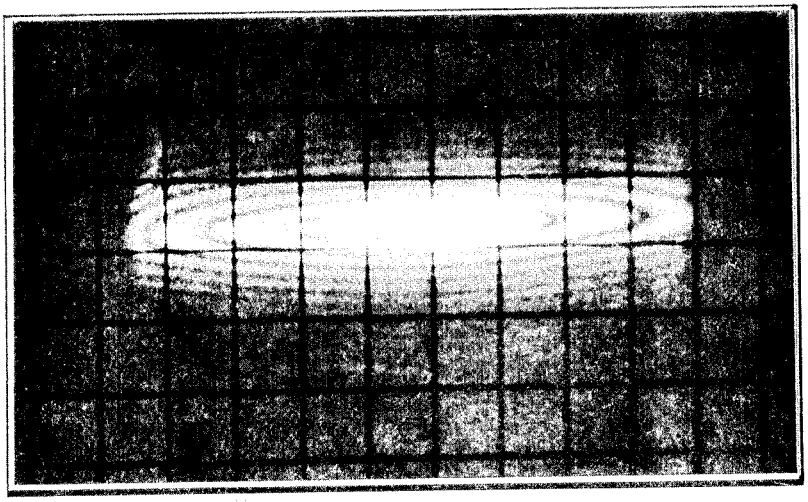

The magnified beam image was steady and its diffraction pattern retained the visual clarity of the unlensed circular beam indicating excellent lensing quality. FIGS. 10, 11 and 12 are photographs taken from this experiment. FIG. 10 is a photograph of the light beam prior to it being lensed. FIG. 11 shows the resulting magnified beam at a pressure of 300 torr. FIG. 12 shows the resulting magnified beam at a pressure of 450 torr.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method of lensing a beam of light comprising:
   providing a plurality of spaced columns of a first gas, said columns being aligned to form a single row of columns;
   providing a second gas in regions between and around said columns, said second gas having a different refractive index than said columns and forming a curved interface about each of said columns; and
   directing said light beam through said columns at an angle substantially transverse to said columns, the light beam being lensed as it passes through the curved interface about each of said columns.

2. The method of claim 1 wherein said columns are parallel thereby producing one-dimensional lensing action.

3. The method of claim 1 wherein said columns are oriented in different directions thereby producing two-dimensional lensing action.

4. The method of claim 1 wherein said beam of light is a laser.

5. The method of claim 1 wherein each column is provided by a flow of gas jets.

6. The method of claim 5 wherein said second gas is provided by a gas flow in said regions between and around said columns.

7. The method of claim 6 wherein the second gas has a higher index of refraction than the first gas thereby producing a diverging lensing action.

8. The method of claim 6 wherein the second gas has a lower index of refraction than the first gas thereby producing a converging lensing action.

9. The method of claim 6 including varying the index of refraction of each of said first gas or said second gas or both of said gases thereby changing the strength of the resultant lensing action.

10. The method of claim 9 wherein the index of refraction of either said first gas or said second gas or both of said gases is varied by replacing either or both of said gases with a different species of gas.

11. The method of claim 9 wherein the index of refraction of either said first gas or said second gas or both of said gases is varied by varying the pressure of either or both of said gases.

12. The method of claim 9 wherein the index of refraction of either said first gas or said second gas or both of said gases is varied by varying the temperature of either or both of said gases.

13. A method of lensing a beam of light, comprising:
   injecting a first gas through a plurality of orifices in one end of an enclosure, said orifices being aligned in a row, the injection of first gas thereby resulting in a row of gas jets, each gas jet flowing through said enclosure;

providing a second gas in regions between and around said gas jets, said second gas having a different refractive index than the first gas, each interface between each gas jet and said second gas being curved; and directing said beam of light through said row of gas jets at an angle substantially transverse to said gas jets and at a selected distance from said orifices so as to optimize diffusional characteristics of the first gas/second gas interfaces, the beam of light being lensed as it passes through the various interfaces.

14. The method of claim 13 wherein said orifices are located at a bottom of said enclosure, the flow of said gas jets being upward.

15. The method of claim 13 wherein the steps recited in claim 13 are substantially repeated for a second enclosure along the path of said beam of light downstream said first enclosure, thereby resulting in two-dimensional lensing of said beam of light.

16. An apparatus for lensing a beam of light, comprising:

an enclosure;

a plurality of spaced columns of a first gas provided within said enclosure, said columns being aligned in a row;

a second gas located in regions between and around said columns, said second gas having a different refractive index than said columns and forming a curved interface about each of said columns; and means for permitting the light beam to be passed through said gas columns at an angle substantially transverse to said gas columns, the light beam being lensed as it passes through the curved interface about each of said columns.

17. The apparatus of claim 16 further including manifolding means for introducing said first gas to said orifices and said second gas to said perforations.

18. The apparatus of claim 17 further including means for varying the pressures of said gases thereby varying their indices of refraction.

19. The apparatus of claim 18 further including means for varying the temperature of said gases thereby varying their indices of refraction.

20. The apparatus of claim 16 wherein said columns are gas jets formed by injecting said first gas through orifices.

21. The apparatus of claim 20 wherein said second gas is provided by flowing said second gas through perforations on an end of said enclosure so that said second gas forms a mantle within the enclosure around said gas jets.

22. The apparatus of claim 21 wherein said beam of light is a laser which is directed through said row of gas jets at an angle substantially transverse to said gas jets and at a selected distance from said orifices, said distance being such as to optimize the diffusional characteristics of said curved interfaces.

23. The apparatus of claim 22 wherein said orifices are located in a bottom end of said enclosure, the flow of said gas jets being in an upward direction and substantially parallel, thereby resulting in one-dimensional lensing.

24. The apparatus of claim 23 wherein said enclosure includes two side windows, one window for providing entry of said light beam into the enclosure and the second for allowing exit iof said light beam from said enclosure.

25. The apparatus as claimed in claim 24 further including a second set of the elements claimed in claim 19, said secind set being oriented in the path of said light beam after it exits the first enclosure, said two enclosures in series providing two-dimensional lensing action.

26. The apparatus of claim 22 wherein said gas jets are oriented in different directions thereby producing a two-dimensional lensing action.

* * * * *